(12) United States Patent
Sukonthapanich

(10) Patent No.: US 7,987,743 B2
(45) Date of Patent: Aug. 2, 2011

(54) POSITIVE RELEASE CRASH PEDAL MECHANISM

(75) Inventor: Dusit Sukonthapanich, Newmarket (CA)

(73) Assignee: Ventra Group, Inc., Ontario (CA)

( * ) Notice: Subject to any disclaimer, the term of this patent is extended or adjusted under 35 U.S.C. 154(b) by 217 days.

(21) Appl. No.: 12/339,926

(22) Filed: Dec. 19, 2008

(65) Prior Publication Data

US 2010/0154581 A1    Jun. 24, 2010

(51) Int. Cl.
*G05G 1/30*    (2008.04)
(52) U.S. Cl. ........................................ 74/512
(58) Field of Classification Search .............. 74/512, 74/513, 560; 180/271, 281
See application file for complete search history.

(56) References Cited

U.S. PATENT DOCUMENTS

| | | |
|---|---|---|
| 5,615,749 A | 4/1997 | Kato |
| 5,921,144 A | 7/1999 | Williams |
| 5,996,440 A | 12/1999 | Nawata |
| 6,041,674 A | 3/2000 | Kato |
| 6,055,883 A | 5/2000 | Kato |
| 6,070,488 A | 6/2000 | Yabusaki |
| 6,070,489 A | 6/2000 | Ananthasivan |
| 6,076,422 A | 6/2000 | Tabata |
| 6,082,219 A | 7/2000 | Wolpert |
| 6,089,119 A | 7/2000 | Leboisne |
| 6,089,342 A | 7/2000 | Muller |
| 6,101,894 A | 8/2000 | Tiemann |
| 6,112,615 A | 9/2000 | Nawata |
| 6,112,616 A | 9/2000 | Schonlau |
| 6,142,036 A | 11/2000 | Mizuma |
| 6,176,340 B1 * | 1/2001 | Mizuma et al. ............... 180/274 |
| 6,178,846 B1 | 1/2001 | Specht |
| 6,182,525 B1 | 2/2001 | Bowers |
| 6,182,526 B1 | 2/2001 | Brooks |
| 6,186,025 B1 | 2/2001 | Engelgau |
| 6,209,416 B1 | 4/2001 | Tiemann |
| 6,279,417 B1 | 8/2001 | Mizuma |
| 6,336,376 B1 | 1/2002 | Lee |
| 6,354,171 B1 | 3/2002 | Wolpert |
| 6,364,046 B1 | 4/2002 | Forssell |
| 6,375,220 B1 | 4/2002 | Kamm |
| 6,393,934 B1 * | 5/2002 | Rixon et al. ................... 74/512 |
| 6,408,711 B1 | 6/2002 | Mizuma |
| 6,418,812 B2 | 7/2002 | Mizuma |
| 6,481,311 B1 | 11/2002 | Sanagi |
| 6,539,823 B1 | 4/2003 | Tomono |
| 6,565,160 B1 | 5/2003 | Ewing |
| 6,571,659 B2 | 6/2003 | Choi |

(Continued)

FOREIGN PATENT DOCUMENTS

DE    3203235 A1 *    8/1983

(Continued)

*Primary Examiner* — Vicky A Johnson
(74) *Attorney, Agent, or Firm* — Pillsbury Winthrop Shaw Pittman LLP

(57) ABSTRACT

Provided herein is a pedal assembly for a vehicle with a push rod releasably connected to a pedal arm. The push rod is connected to the pedal arm via a pivoting reaction mount that is capable of rotating from a first position to a second position during vehicle collision. Upon rotation to the second position, the push rod is disconnected from the pedal arm, thereby reducing injury to the driver. The pivoting reaction mount may include a rotatable lever. An actuation mechanism, such as a reaction bracket, is mounted to a vehicle structure adjacent the push rod, and may actuate rotation of the pivoting reaction mount.

23 Claims, 7 Drawing Sheets

U.S. PATENT DOCUMENTS

| | | |
|---|---|---|
| 6,655,489 B2 | 12/2003 | Kawai |
| 6,658,964 B2 | 12/2003 | Bang |
| 6,679,135 B1 | 1/2004 | Faigle |
| 6,701,800 B2 | 3/2004 | Saitou |
| 6,742,411 B2 | 6/2004 | Aoki |
| 6,752,038 B2 | 6/2004 | Cordero |
| 6,786,109 B2 | 9/2004 | Mueller |
| 6,808,040 B2 | 10/2004 | Hayashihara |
| 6,810,766 B2 | 11/2004 | Mizuma |
| 6,817,436 B2 | 11/2004 | Yang |
| 6,898,995 B1 | 5/2005 | Schonlau |
| 6,951,152 B2 | 10/2005 | Strole |
| 7,059,213 B2 | 6/2006 | Burgstaler |
| 7,077,028 B2 | 7/2006 | Misonou |
| 7,096,755 B2 | 8/2006 | Cha |
| 7,111,703 B2 | 9/2006 | Endo |
| 7,191,681 B2 | 3/2007 | Sato |
| 7,191,682 B2 | 3/2007 | Sando |
| 7,195,091 B2 | 3/2007 | Rixon |
| 7,201,082 B2 | 4/2007 | Yamada |
| 7,267,194 B2 | 9/2007 | Miyoshi |
| 7,275,614 B2 | 10/2007 | Hayashi |
| 7,409,889 B2 * | 8/2008 | Hurwic et al. .................. 74/560 |
| 7,441,478 B2 * | 10/2008 | Burgstaler et al. .............. 74/512 |
| 7,497,144 B2 * | 3/2009 | Yoon ............................... 74/512 |
| 7,730,989 B2 * | 6/2010 | Canals Riba et al. ......... 180/274 |
| 7,775,555 B2 * | 8/2010 | Allen et al. ................... 280/748 |
| 2001/0006010 A1 | 7/2001 | Choi |
| 2001/0027696 A1 | 10/2001 | Mizuma |
| 2002/0007693 A1 | 1/2002 | Mueller |
| 2002/0078783 A1 | 6/2002 | Bang |
| 2002/0174739 A1 | 11/2002 | Cordero |
| 2002/0184962 A1 | 12/2002 | Saitou |
| 2002/0189391 A1 | 12/2002 | Matsumoto |
| 2003/0075005 A1 | 4/2003 | Schiel |
| 2003/0140726 A1 | 7/2003 | Burgstaler |
| 2004/0003674 A1 | 1/2004 | Endo |
| 2004/0211286 A1 | 10/2004 | Schwerdt |
| 2004/0231453 A1 | 11/2004 | Harashima |
| 2005/0044982 A1 | 3/2005 | Hayashi |
| 2005/0050980 A1 | 3/2005 | Park |
| 2005/0103151 A1 | 5/2005 | Yoon |
| 2005/0188781 A1 * | 9/2005 | Suzuki ........................... 74/512 |
| 2005/0229738 A1 | 10/2005 | Podkopayev |
| 2005/0241432 A1 | 11/2005 | Burgstaler |
| 2005/0247157 A1 | 11/2005 | Jasseron |
| 2005/0275204 A1 | 12/2005 | Noh |
| 2006/0070487 A1 | 4/2006 | Hayashi |
| 2007/0068321 A1 | 3/2007 | Song |
| 2007/0137394 A1 | 6/2007 | Park |
| 2007/0175692 A1 | 8/2007 | Hasegawa |
| 2007/0234841 A1 | 10/2007 | Tokumo |
| 2007/0266815 A1 | 11/2007 | Johansson |
| 2008/0047386 A1 | 2/2008 | Ridgway |
| 2008/0053265 A1 | 3/2008 | Bannon |

FOREIGN PATENT DOCUMENTS

| | | |
|---|---|---|
| EP | 433702 A2 * | 6/1991 |
| FR | 2 841 011 | 12/2003 |
| GB | 2244324 A * | 11/1991 |

* cited by examiner

US 7,987,743 B2

POSITIVE RELEASE CRASH PEDAL MECHANISM

BACKGROUND

1. Field of Invention

The present invention is generally related to a pedal assembly of a vehicle, and, more particularly, a pedal assembly having a mechanism for reducing injury to a driver during or after a collision or impact.

2. Description of Related Art

A pedal, such as a brake pedal, is mounted to a dash panel in a vehicle so as to provide a driver easy access and manipulation via his/her foot. However, in case of impact, the brake pedal may potentially cause damage to the driver's lower extremities, including the foot, ankle, shin, and/or knee, particularly when the driver is pushed forward toward the front of the vehicle via inertia and other forces. Thus, the ability to decouple pedals from the dash panel have been developed.

Generally, devices or assemblies for moving or decoupling a pedal in a vehicle are known in the art. Some current methods rely on a large number of parts to perform this function. Also, some current methods provide methods for breaking a connection of the pedal to the vehicle. However, these methods generally describe breaking a joint to the extent that the pedal will not function after the crash. Rendering a pedal assembly inoperable is inconvenient and costly to a driver.

FR Patent 2841011 illustrates an example of a pedal decoupler as known in the art with a releasable connection that may be released on vehicle impact. The FR 2841011 design includes a cable which requires tension to activate the crash feature, yet must remain slacked to ensure proper operation during typical pedal use. Such a design increases the possibility that the cable could get caught, or foul on something under the dash, thus preventing the system from functioning or engaging at an inopportune time.

Additionally, because the cable requires such tension for activation, the FR '011 Patent is limited as to where a location for mounting can be placed in the vehicle. Prior art designs of such pedal assemblies may be limited in their locations for mounting due to the number of parts required for assembly, or due to inefficient design (e.g., some designs must be placed above and/or forward of the pedal assembly). For example, such pedal assemblies, such as that shown in FR 2841011, may require a substantial number of parts and devices, which in turn may require some clearance with regard to other parts in order to prevent the parts/devices from jamming in the event of a crash.

Thus, an improved pedal assembly which reduces injury to a driver as well as reduces the above-noted limitations (e.g., broken connection, space limitations) would be beneficial.

SUMMARY

One aspect of the invention provides a pedal assembly for operating a push rod that activates a functional system of a vehicle. The pedal assembly includes a pedal arm having an elongated structure. The first end of the elongated structure is configured to be pivotally mounted and a second end of the elongated structure has a pedal plate attached thereto. The pedal plate is accessible by a foot of a driver. The pedal assembly also includes a release mechanism having a pivoting reaction mount and an actuation mechanism. The pivoting reaction mount is configured to connect the push rod to the pedal arm to enable pivoting of the pedal arm to push the push rod. The pivoting reaction mount is pivotally mounted to the pedal arm for pivoting between a first position and a second position, and has a contact portion for contacting to pivot the reaction mount between the first and second positions. The pivoting reaction mount is configured to connect the push rod to the pedal arm in the first position and disconnect the push rod from the pedal arm in the second position. Also, the actuation mechanism is configured to be mounted to a vehicle structure in spaced relation to the contact portion of the pivoting reaction mount, such that the actuation mechanism is able to contact the contact portion during a vehicle collision and actuate the pivoting of the pivoting reaction mount from the first position to the second position.

Another aspect of the invention provides a vehicle having a pedal assembly, the pedal assembly including a pedal arm pivotally mounted in the vehicle and a push rod releasably connected to the pedal arm. The pedal arm has a pedal plate attached thereto, and the pedal plate is accessible by a foot of a driver. The push rod is configured to be pushed so that the pedal arm pivots due to an application of force by the foot of the driver on the pedal plate. The pedal assembly also includes a release mechanism having a pivoting reaction mount and an actuation mechanism. The pivoting reaction mount is configured to connect the push rod to the pedal arm to enable pivoting of the pedal arm to push the push rod. The pivoting reaction mount is pivotally mounted to the pedal arm for pivoting between a first position and a second position, and has a contact portion for contacting to pivot the reaction mount between the first and second positions. The pivoting reaction mount is configured to connect the push rod to the pedal arm in the first position and disconnect the push rod from the pedal arm in the second position. Also, the actuation mechanism is configured to mount to a vehicle structure in spaced relation to the contact portion of the pivoting reaction mount, and configured to contact the contact portion during a vehicle collision and actuate the rotation of the pivoting reaction mount from the first position to the second position.

Other objects, features, and advantages of the present invention will become apparent from the following detailed description, the accompanying drawings, and the appended claims.

DETAILED DESCRIPTION OF THE PREFERRED EMBODIMENT(S)

Figure 1:
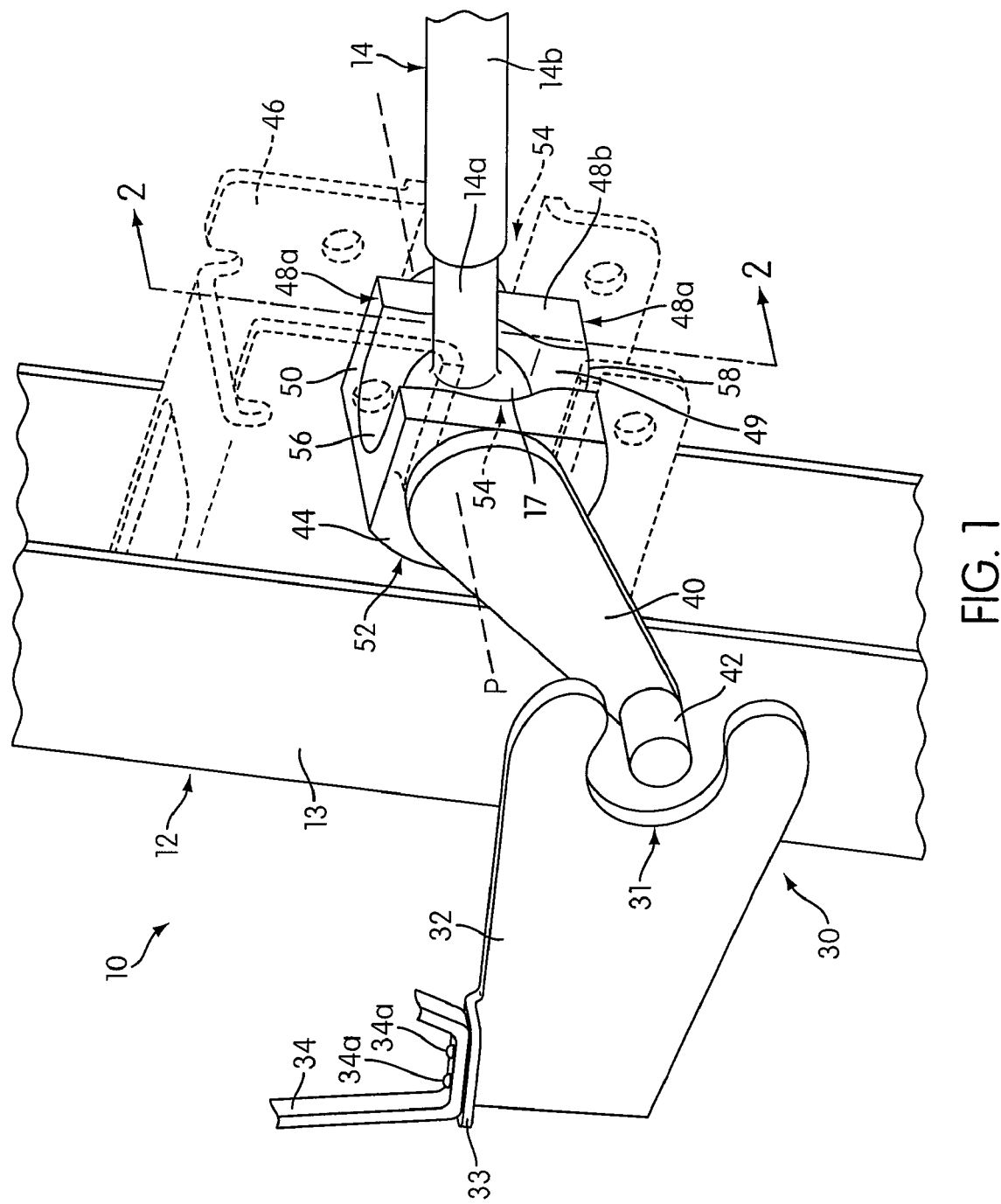
FIG. 1 illustrates a detailed, perspective view of a pedal structure with release mechanism in accordance with an embodiment of the present invention.

FIG. 1 illustrates a detailed, perspective view of a pedal assembly 10 or "pedal" with release mechanism 30 in accordance with an embodiment of the present invention. The pedal assembly 10 as described herein is designed such that its assembly or structure disengages or disconnects from a part of the vehicle in the event of impact, crash or collision, such as with another object. For simplicity purposes only, such events will be referred to herein as "incidents." Of course, the term incidents should not be limiting, and should be understood to include impact with an object or another vehicle in which forces are great enough to cause injury to a driver or user of a vehicle.

More specifically, during an incident, the pedal 10 may be released for movement with respect to a vehicle structure, so that, upon compression of the vehicle structure and forced movement of its parts and a front end of the vehicle, injury to a driver is reduced. Injury or damage to the driver's body, particularly one's lower extremities including ankles or knees, may be caused by movement of the vehicle parts and/or movement of the driver as a result of the forces caused by the incident. For example, the driver or user may be forced via inertia in a forward direction toward a vehicle's instrument panel and/or dash board. Additionally, during an incident, injury to a driver may be exacerbated, particularly when the pedal 10 is a brake pedal, and the brake push rod may be driven relatively rearwardly to force the pedal against the driver's lower extremity during the incident. That is, because of the natural tendency for the driver to be pressing down on the pedal to apply the brakes to the vehicle, the driver may be subjected to greater injury as a result of the forces and relative movement of the pedal, vehicle parts, and himself/herself caused by the incident. Thus, the decoupling or disconnecting of the push rod 14 of the pedal assembly 10 as herein described thereby aims to substantially reduce or eliminate such injury or damage by releasing at least a part of the pedal's mounting location.

Generally speaking, the terms "pedal", "pedal assembly", or "pedal structure" used interchangeably throughout this specification are not intended to be limiting to a specific type of pedal device, but intended to be used as a crash decoupling device for brake and/or clutch pedals. It can be used for a brake pedal, in which case it disconnects the pedal from a brake booster, or for a clutch pedal, in which case it disconnects the pedal from the clutch master cylinder of a transmission system of a vehicle. The pedal may be used with any functional system (e.g., brake system, transmission) of the vehicle. Also, the materials used to manufacture the pedal assembly should not be limiting. The pedal and its parts could be made from steel (tubular or blade-type) or plastic materials, for example.

Figure 3:
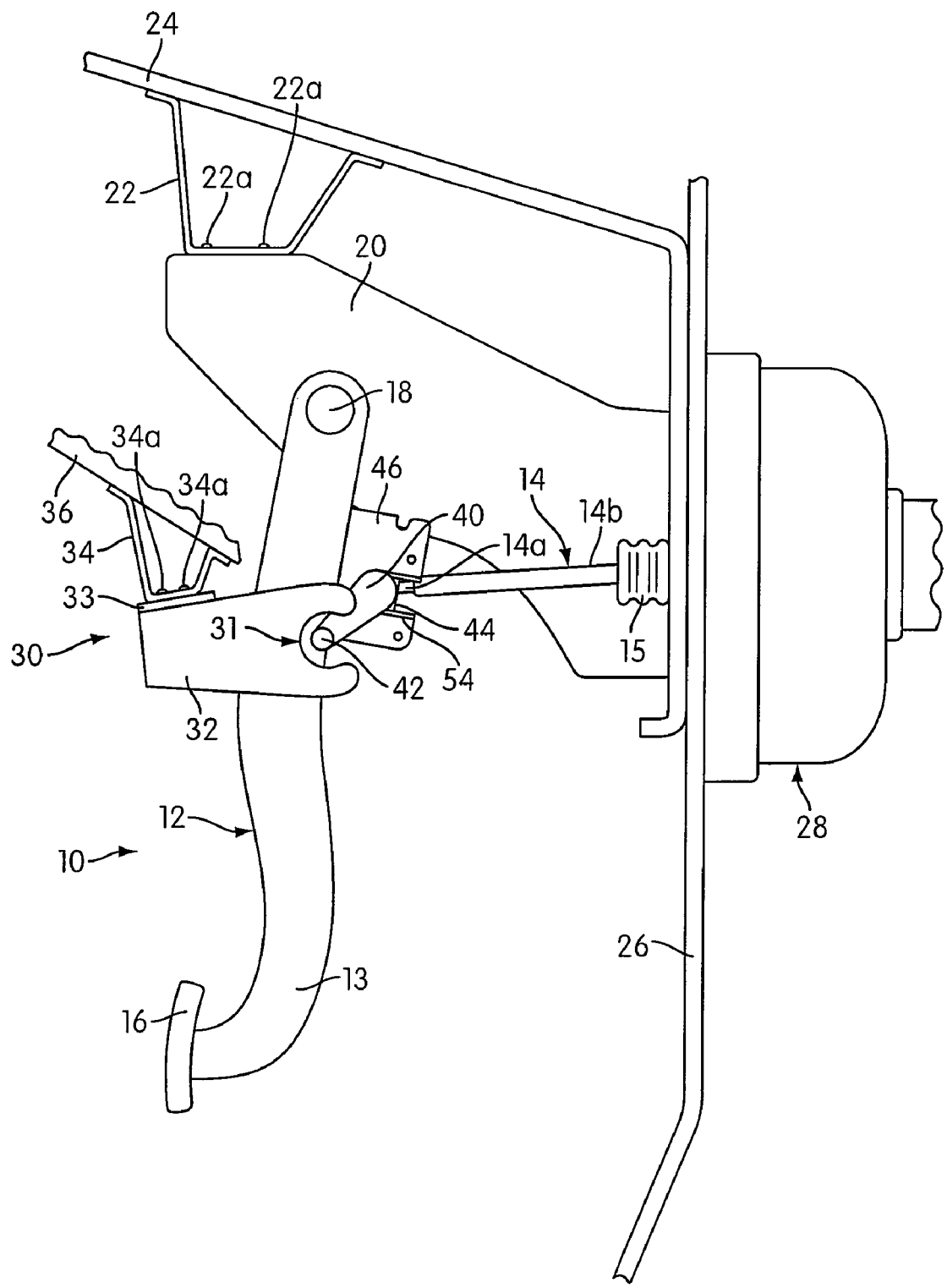
FIG. 3 illustrates a side view of the pedal structure of FIG. 1 mounted in a vehicle in accordance with an embodiment of the present invention.

Referring now more particularly to the drawings, the pedal assembly 10, shown entirely in FIG. 3, is a brake pedal 10 connected to a brake booster 28. For explanatory purposes only the pedal 10 is described with reference to a braking system, but should not be limited to such. The pedal assembly 10 is provided in the vehicle such that it is easily accessible by a driver. For example, in some cases, the pedal assembly 10 is mounted in relation to the dashboard 24 and an instrument panel (IP). The dashboard 24 of the vehicle, also referred to as the "dash", may comprise an upper panel and a lower panel that are connected to each other (e.g., using methods or devices known in the art). In some embodiments, the upper dash panel and lower dash panel may comprise a uniform or single piece. The panels are generally connected to a plurality of devices of the vehicle. For example, the dash 24 may be connected to another vehicle structure 26, sometimes referred to as a lower dashboard or a firewall. A brake booster 28 of the brake system is fixed to the lower dash panel or firewall 26 and to brake pedal 10 via a push rod 14 (described in detail below).

The pedal assembly 10 comprises a pedal arm 12. Pedal arm 12 has an elongated pedal structure 13 that is configured to be pivotally mounted at a first end, and has a pedal plate 16 attached at its second end. In some embodiments, the elongated structure 13 may be pivotally connected to a pedal bracket 20 via a pin or shaft 18. Pedal bracket 20 may optionally be a bracket used in cooperation with other brackets, such as vehicle bracket 22, for pivotally connecting the pedal arm 12 to the vehicle. Of course, the devices used and their design are not meant to be limiting; thus, alternate designs and assemblies for connecting a pedal to a vehicle may be used and would not be considered beyond the scope of the present disclosure. Referring back to FIG. 3, the pedal bracket 20 may be connected at a first end to a part of an upper panel of the dashboard 24 via a vehicle bracket 22. A second end of the pedal bracket 20 may be connected directly to a lower panel of the dashboard 24, or, alternatively, via one or more brackets (not shown). Pedal bracket 20 may be connected to vehicle bracket 22 (or the dash, in general) using conventional fastening devices 22a such as nuts and bolts, or by other methods such as welding. As such, the mounting of the pedal bracket 20 to the vehicle is not meant to be limiting.

The pedal plate 16 or part at the second end of the elongated structure 13 is accessible by a foot of the driver or user such that an application of force by the driver's or user's foot may be applied thereto. During normal operation, a driver or user of a vehicle may apply force via his foot on the pedal plate 16 to activate a functional system of the vehicle (e.g., brake booster 28 of the brake system). "Normal" operation circumstances as referred to throughout this description is defined by a time during which a vehicle is being operated safely and without incidence of impact such as caused by a crash or collision with another vehicle, person, or object. Thus, in the embodiment being described herein, the force from a driver or user's foot is configured to cooperate with brake booster 28 to translate pivotal motion into a braking force to be applied to the wheels of the vehicle. Such methods for applying a braking force (and the pivotal translation) are known in the art and therefore not discussed in detail herein.

Specifically, the push rod 14 is configured to activate the functional system (e.g., braking device) of the vehicle. The push rod 14 is connected to the brake booster 28 through the lower panel of dash 24. The push rod is connected to a spring or similar mechanism inside the brake booster 28, for example. The push rod 14 translates the pivoting force applied by the foot of the driver as he pushes on the pedal plate 16 to the brake booster 28 via connecting device 15. That is, under normal operation, as the pedal arm 12 rotates about pin 18 with respect to the dash 24, at least a part of the push rod 14 is moved to apply a braking force. Generally, when force is applied, the spring or mechanism of the brake booster 28 is compressed.

As shown in greater detail in FIG. 1, push rod 14, which may comprise a larger portion 14b and a smaller portion 14a, assists in translating an applied force on the pedal plate 16 to the booster 28. The end 17 of the push rod 14 (or, as shown, the end of the smaller portion 14a) is generally mounted to the elongated pedal structure 13 of the pedal arm 12. The end 17 enables the push rod 14 to be releasably connected to the pedal arm 12, further described below.

Generally, when the pedal is a brake pedal, should a driver encounter a situation that may result in an incident, for example, the driver will quickly and forcefully apply force via his foot to the pedal part 16 of the pedal 10. Should impact or collision from such an incident occur (e.g., caused by inertia, kinetic energy, etc.), however, the forces of the impact may cause relative movement of the vehicle structure (and its parts and the driver) and the front of the vehicle, as noted above. Thus, the pedal 10 includes a release mechanism 30 to assist in disconnecting or decoupling at least part of the pedal 10 from the vehicle structure. Generally speaking, the reaction mechanism 30 is used to disconnect a part of the pedal assembly 10 from the vehicle (e.g., the push rod 14 from the pedal structure 13), and prevent energy from being transmitted to a driver's foot.

One element of the release mechanism 30 is a pivoting reaction mount 44, which, under normal circumstances, connects the push rod 14 to the elongated structure 13 of the pedal arm 12. The pivoting reaction mount 44 is configured to connected the push rod 14 to the pedal arm 12 to enable pivoting of the pedal arm 12 to push the push rod 14. The pivoting reaction mount 44 is pivotally mounted to the pedal arm 12 and capable of rotating or pivoting between a first position and a second position. The pivoting reaction mount 44 generally may pivot about a pivot point along an axis P (further described below) that it is inline or close to a centerline of the push rod 14. As will be further described, the pivoting reaction mount 44 has a contact portion for contacting to pivot the reaction mount 44 between first and second positions.

The release mechanism 30 also has an actuation mechanism 32 mounted to the vehicle 36. In some embodiments, the actuation mechanism 32 is mounted adjacent the push rod 14. The actuation mechanism 32 is spaced in relation to a contact portion of the pivoting reaction mount 44, so that the mechanism 32 is configured to contact the contact portion. The actuation mechanism 32 is configured to actuate the rotation of the pivoting reaction mount 44 during incident of the vehicle, so as to actuate the pivoting of the pivoting reaction mount 44. Specifically, the pivoting reaction mount 44 may be contacted or forced by actuation mechanism 32 such that it rotates from the first position to the second position, thereby allowing the push rod 14 to be disconnected from the pedal arm 12. In some embodiments, the vehicle structure 36 may be a steering column, an instrument panel (IP), or a cross beam, for example. In some embodiments, the vehicle structure 36 may include other structural parts of the vehicle, and therefore should not be limiting.

Figure 2:
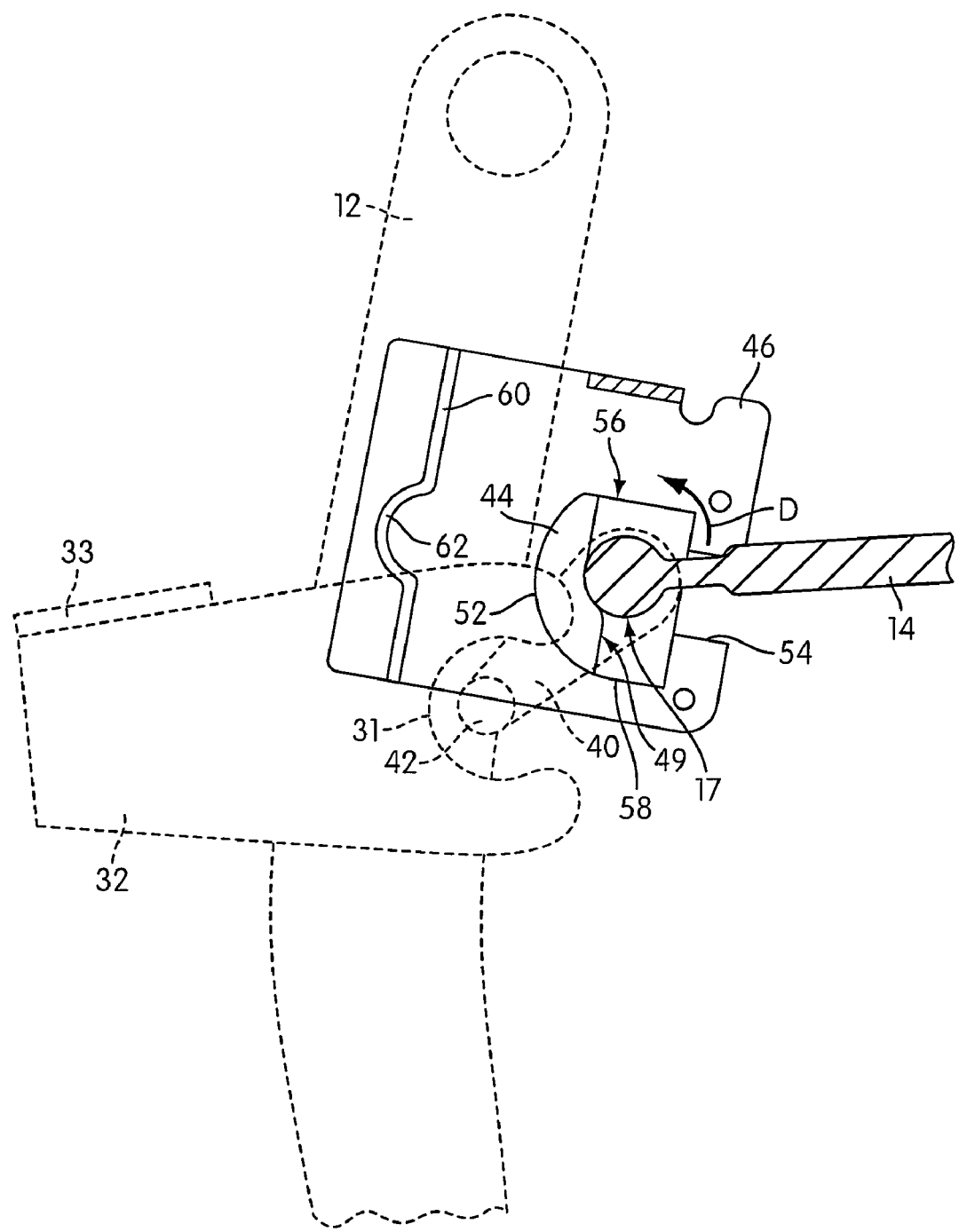
FIG. 2 illustrates a side view, sectioned along line 2-2 of FIG. 1, of the pedal structure.

As shown in greater detail in FIGS. 1 and 2, under normal circumstances, the pivoting reaction mount 44 may be connected to an upper part of the elongated structure 13 of the pedal arm 12. In some cases, the pivoting reaction mount 44 may be directly mounted or connected to the structure 13. For example, if the elongated pedal structure 13 of the pedal arm 12 generally comprises a U-shaped pedal arm, the mount 44 may be attached thereto. In some cases, such as shown in the Figures, the pivoting reaction mount 44 may be connected to the structure 13 via mounting bracket 46. For example, if the elongated pedal structure 13 of the pedal arm 12 generally comprises a blade-type shaped pedal arm, as shown, a mounting bracket 46 may be used to mount the pivoting reaction mount 44 thereto. The pivoting reaction mount 44 may be designed to be partially enclosed in the bracket 46, for example. In some cases, the pivoting reaction mount 44 comprises side surfaces 48a which are secured within side surfaces of the mounting bracket 46, while still providing a slight clearance therebetween to allow for rotation of the pivoting reaction mount 44. The mounting bracket 46 may be secured within the elongated structure 13 of the pedal arm (e.g., as shown in FIG. 1), around the structure 13, or flush therewith in conventional manners and with known devices (e.g., fasteners).

In some embodiments, the pivoting reaction mount 44 may be placed within the mounting bracket 46 such that at least part of the mount 44 is secured through receiving openings 54 provided on each side of the mounting bracket 46. That is, at least a portion of the pivoting reaction mount 44 is accessible through the receiving openings 54. In some embodiments, the pivoting reaction mount 44 may include an extension portion which extends at least partially through a receiving opening 54. The extension portion may receive a fastening device (e.g., a nut) to assist in securing the mount 44 and bracket 46 together. Alternatively, the extension portion may provide a connection area for a device such as rotatable lever 40, further described below. In some embodiments, the extension portion need not be provided, and lever 40 may have at least a portion which extends at least partially through a receiving opening 54 and is connected to at least one side surface 48a of pivoting reaction mount 44.

The pivoting reaction mount 44 is mounted such that it is capable of rotating or pivoting about a pivot axis P. As shown as described with reference to the Figures, the pivot axis P may be provided in a substantially horizontal configuration. However, it should be noted that the pivot axis P may be provided at any angle with respect to a centerline of the push rod 14 (for example, in a substantially vertical configuration, a substantially horizontal configuration, etc.).

Figure 7:
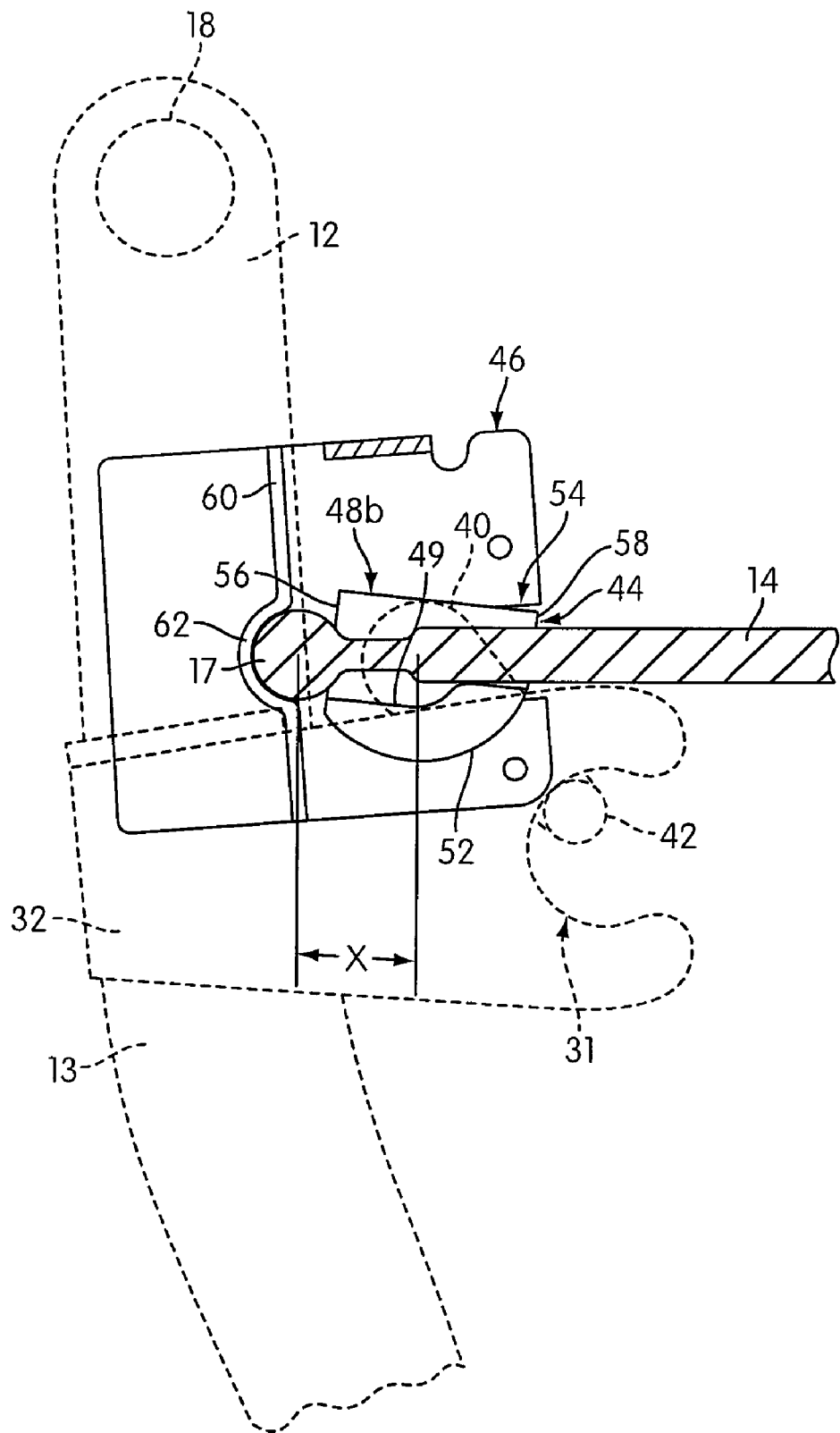
FIG. 7 illustrates a side view, sectioned along line 7-7 of FIG. 6, of the release mechanism after actuation.

FIG. 2 illustrates a side view showing an example of the pivoting reaction mount 44 in a first position. The first position may be defined as a position for mounting or holding a push rod 14 such that it is connected to the pedal arm 12 and activates a functional system of the vehicle during normal operating circumstances. FIG. 7 illustrates a side view showing the pivoting reaction mount 44 in a second position. The second position may be defined as a position for disconnecting or decoupling the push rod 14 from the pedal arm 12. Side surfaces 48a of the pivoting reaction mount 44 are provided in a first plane when in the first position. Also, a front surface 48b of the mount 44 is provided in a second plane when in the first position. After rotation of the mount 44 into the second position, the side surfaces 48a are provided in a third plane, and the front surface 48b is provided in the first plane. In an embodiment, the second plane is substantially perpendicular to the first plane. Similarly, the third plane may be substantially perpendicular to the second plane.

As shown, when the pivoting reaction mount 44 is rotated about pivot axis P, an end 17 of the push rod 14 is disconnected or decoupled and able to move with respect to the pedal arm 12. Specifically, the design and shape of the pivoting reaction mount 44 and the end 17 of the push rod 14 provides a secure yet releasable connection, whose advantages will become more evident as described.

In an embodiment, the push rod end 17 comprises a substantially round or circular shape. The shape of the end 17 assists in providing a cooperative connection with the pivoting reaction mount 44 and a smooth release of the push rod 14 during an incident. The end 17 provides the releasable connection of the push rod 14 to the pedal arm 12, thereby allowing the pedal assembly 10 to function under normal operational circumstances. Thus, as force is applied to the pedal, the pedal arm 12 pivots and the push rod 14 moves to activate the functional system (e.g., to compress a spring or mechanism corresponding to the brake booster 28). When force is released from the pedal, the spring or mechanism of the functional system/brake booster 28 releases its energy (e.g., due to its compression) to provide a spring force to move the pedal back to a neutral position, for example.

In an embodiment, the pivoting reaction mount 44 comprises a cutout or receiving area 50 to accept the substantially round end portion 17 of the push rod 14. In an embodiment, the receiving area 50 comprises inner walls 49 whose surfaces are shaped or contoured to correspond to the shape of the push rod end 17. Generally, the receiving area 50 is configured to receive and lock the end portion 17 of the push rod 14 therein when the pivoting reaction mount 44 is in the first position, and configured to release the end portion 17 when the pivoting reaction mount 44 is in the second position. The substantially circular or rounded end 17 and the inner walls 49 assist in providing both a secure and releasable connection that does not require permanent fastening devices. As shown in the sectional view of FIG. 2, the inner walls 49 have surfaces which are substantially smooth or rounded to be in contact with at least part of the substantially circular or rounded push rod end 17. The contour of the wall surfaces 49 allows for a cooperative connection which allows the mount 44 to rotate while the end 17 remains secure therebetween.

The receiving area 50 also includes a first slot 56 and a second slot 58. First slot 56 is provided such that the end portion 17 of the push rod 14 may be released or disconnected therethrough. Second slot 58 allows at least a portion of the push rod (or its portion 14a) to be seated therein when the mount 44 rotates to the second position.

As previously noted, the release mechanism 30 may further comprise a rotatable lever 40. Rotatable lever 40 is connected to the pivoting reaction mount 44 and is configured to rotate about pivot axis P. Rotation of the rotatable lever 40 about pivot axis P actuates the rotation of the pivoting reaction mount 44 from its first position to the second position. The rotatable lever 40 may comprise the contact portion of the pivoting reaction mount 44. For example, as shown in FIG. 1, rotatable lever 40 comprises a lever end 42 which may be used as a contact portion or an activation device for rotating lever 40 about pivot axis P. Lever end 42 may extend outwardly from the lever 40 such that the actuation mechanism 32 actuates rotation of the rotatable lever 40 via contact with the lever end 42.

More specifically, as shown in FIG. 1, for example, the actuation mechanism 32 may comprise a reaction bracket 32 mounted adjacent the lever end 42. The reaction bracket 32 is mounted to the vehicle structure 36 in a manner such that it is capable or configured to contact a contact portion of the pivoting reaction mount 44, i.e., the lever end 42, during an incident to thereby actuate the rotation of the lever 40. The reaction bracket 32 may have an extension portion 33 which is mounted to a bracket 34 for mounting to the vehicle structure 36. The reaction bracket 32 may be mounted via fasteners 34a, for example, as known in the art, or other methods such as welding.

Generally, the actuation mechanism 32 is configured to actuate rotation of the pivoting reaction mount 44 during an incident upon relative movement of the vehicle structure 36 and at least a part of a front part of the vehicle (e.g., the lower dash or firewall 26). The location of the actuation mechanism 32 and/or the lever 40 and its end 42 should not be limiting. For example, the actuation mechanism 32 and lever 40 may be mounted or provided in a relative location that is substantially above or below the pivoting reaction mount 44. Additionally or alternatively, the actuation mechanism 32 and lever 40 may be provided on a left side or right side, relative to the pedal (e.g., located on the left or right side in relation to the pedal arm 13). The actuation mechanism 32 may be mounted in a position that is closer to the driver than a mounting position of the pivoting reaction mount 44 during normal operation of the vehicle, or, alternatively, the mechanism 32 may be mounted in a position that is further from the driver than a mounting position of the pivoting reaction mount 44.

The reaction bracket 32 may have an opening 31 at one end thereof to assist in actuating rotation of the mount 44. In some embodiments, the lever end 42 is formed such that, when the lever 40 mounted, the end 42 extends at least partially into the contoured opening 31 of the actuation mechanism 32. As described below with regard to FIGS. 4-6, the lever 40 is rotated upon forceful contact of the reaction mount 32 and the lever end 42 (e.g., during an incident such as a collision).

Figure 4:
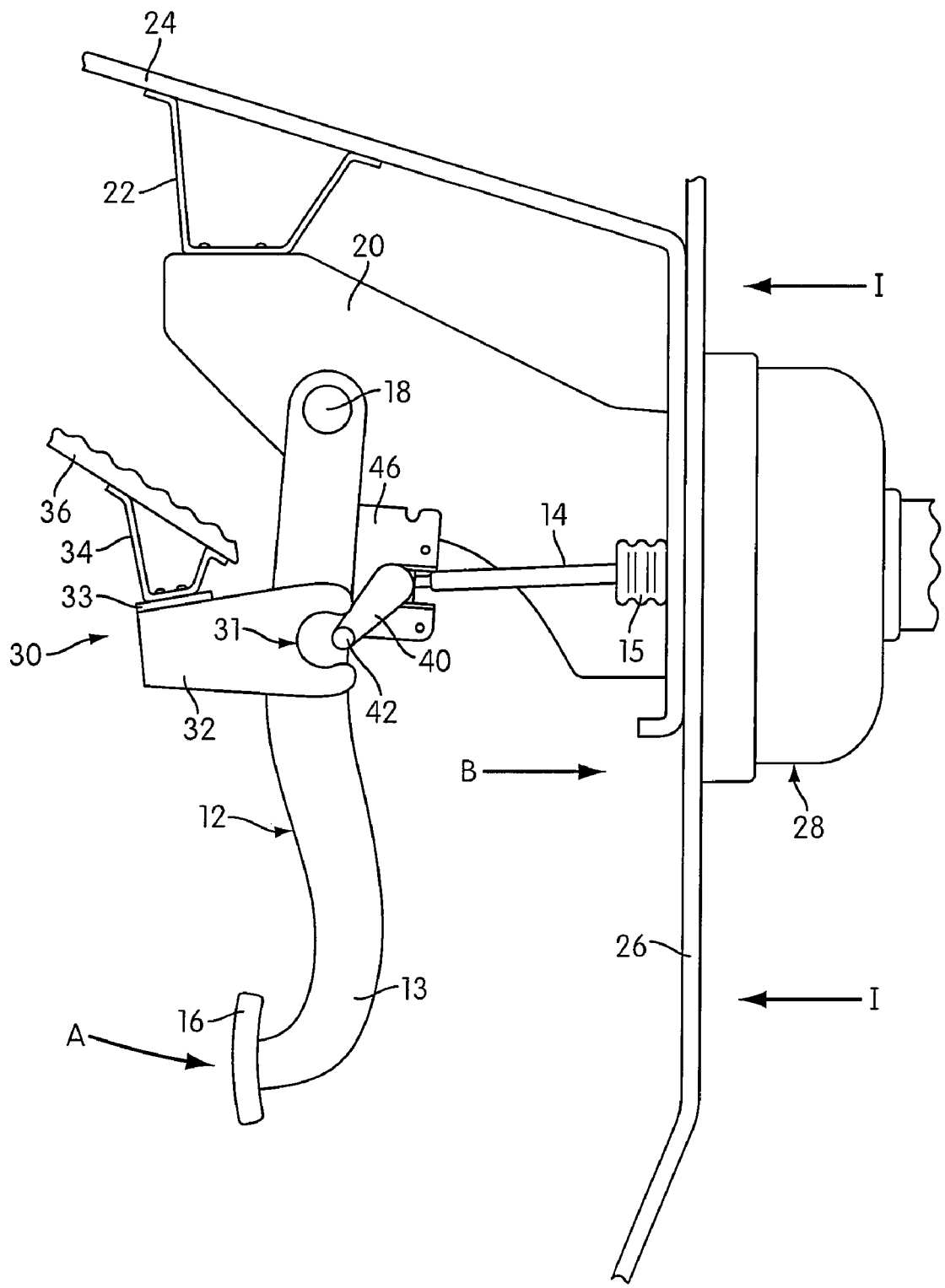
FIG. 4 shows a side view illustrating the actuation of the release mechanism of the pedal structure during a collision.
Figure 5:
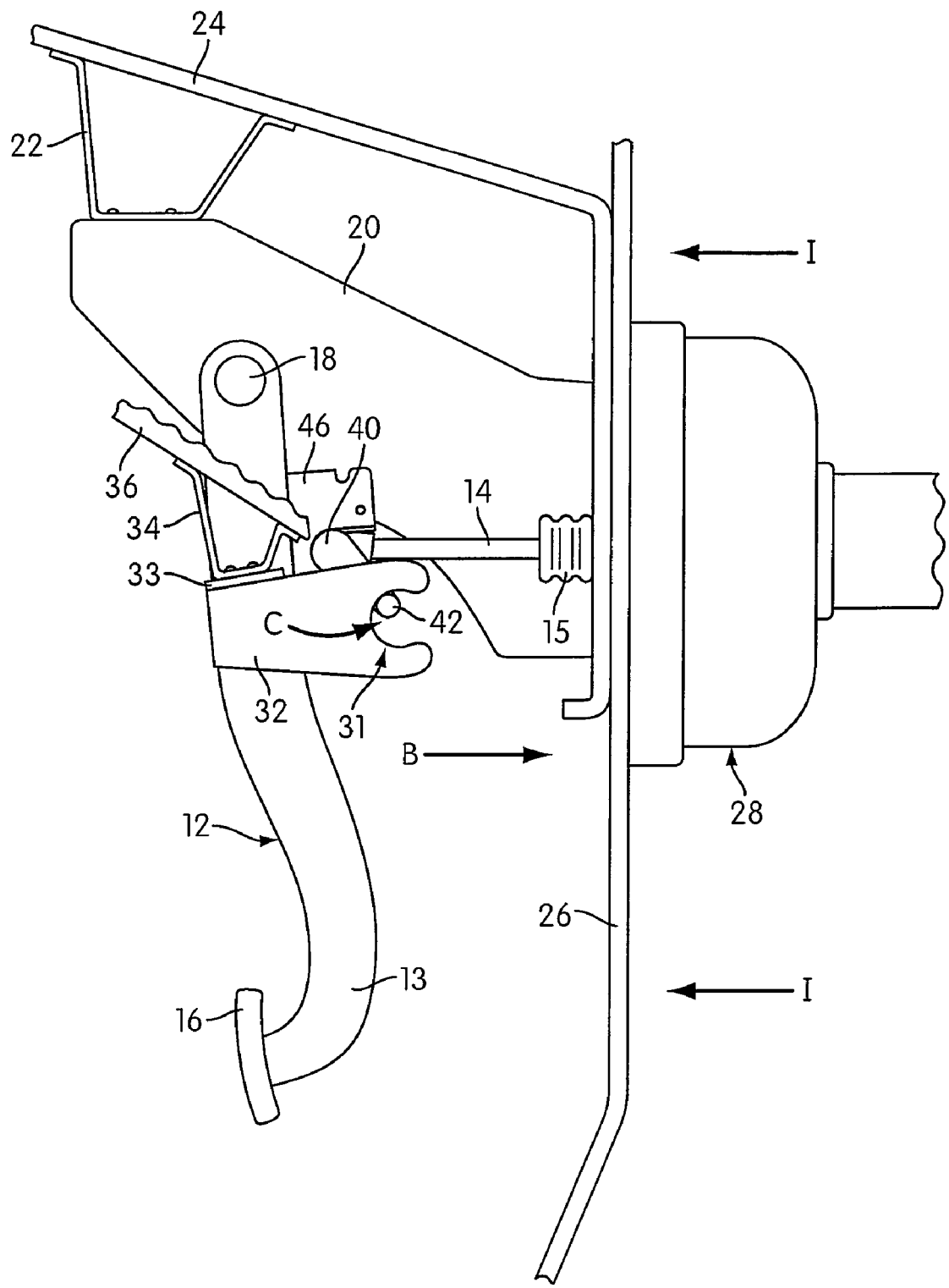
FIG. 5 shows a side view illustrating the movement of the release mechanism and the vehicle during a collision.
Figure 6:
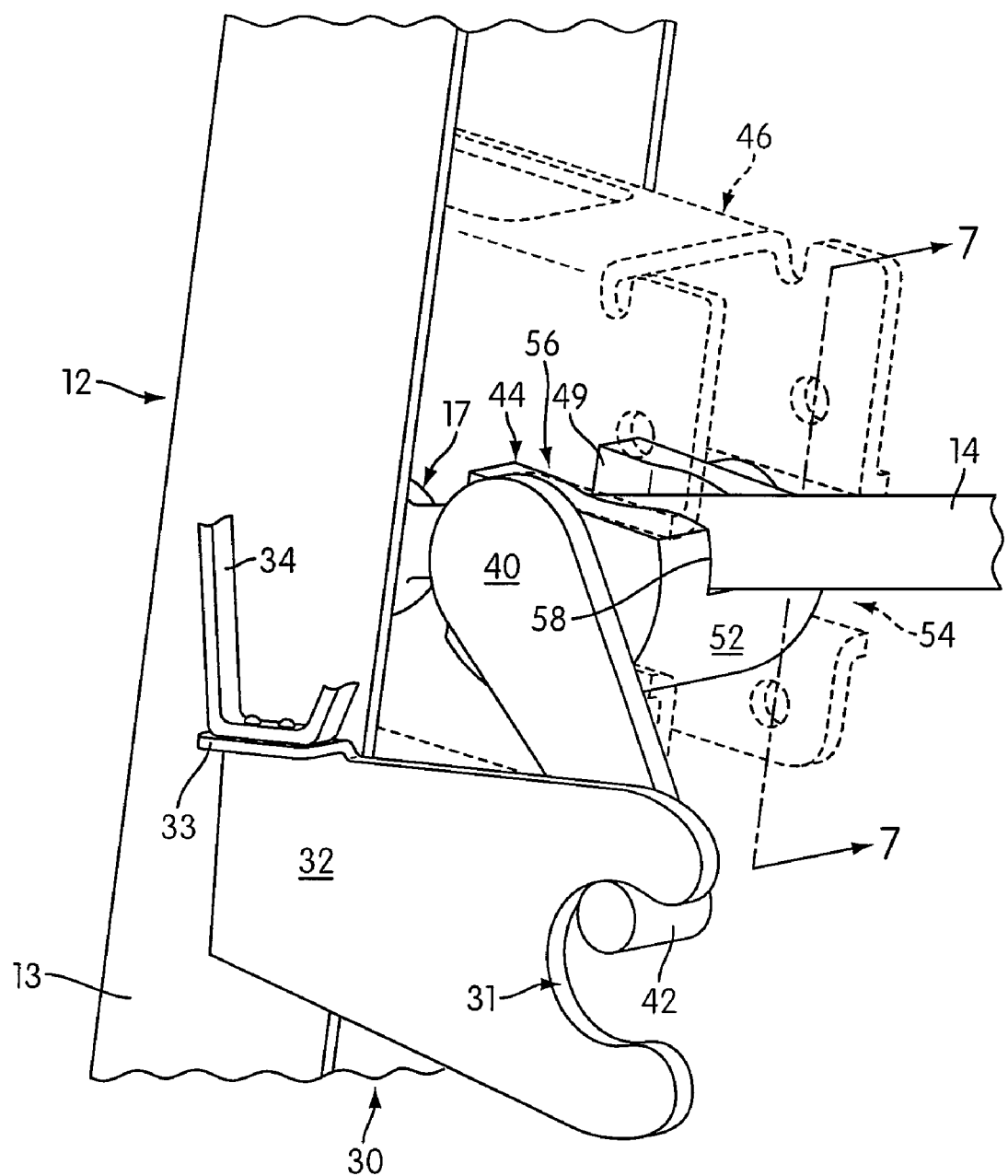
FIG. 6 illustrates a detailed, perspective view of the release mechanism after actuation.

FIGS. 4-6 illustrate the pedal 10 and release mechanism 30 as they are actuated during an incident. Specifically, a driver or user may apply a pedal force A via his foot to the pedal plate 16 of the pedal arm 12 to apply a braking force to wheels of the vehicle, for example. Upon the occurrence of an incident, such as a frontal collision with another object, the front part of the vehicle and the vehicle structure 36 and its corresponding parts (e.g., parts and structures inside the cabin) move relative to one another. For example, the front part of the vehicle may undergo deformation such that it moves in a relative direction I as a result of impact force, while the vehicle structure 36 moves in a relative direction B. As shown in FIG. 5, the front of the vehicle (including the structure 26) and the vehicle structure 36 move relative to each other such that the space therebetween becomes compacted. In some embodiments, the actuation mechanism 32 and the brake system (or its booster 28) are moved relative to each other during the incident. Nonetheless, as the front part of the vehicle and vehicle structure 36 are moved with respect to each other, the actuation mechanism 32 or reaction bracket and at least the lever end 42 of the rotatable lever 40 are moved relative to each other. Thus, the reaction bracket and lever end 42 may be forced into contact thereby rotating the lever 40 about pivot axis P in a direction C. Specifically, rotation in direction C causes the lever 40 to rotate the pivoting reaction mount 44 from the first position to the second position. Then, as shown in FIG. 6, after rotation, the push rod 14 is disconnected from the pivoting reaction mount and thus the pedal arm 12. Specifically, as the mount 44 rotates, at least portion of the push rod 14 (e.g., the inner or outer portions) is directed into the second slot 58 of the mount 44. Then, when in the second position, the reaction forces as a result of the incident enable disconnection of the substantially round end portion 17 from the internal walls 42 of the mount 44. The end 17 of the push rod 14 is then guided through the first slot 56 (also shown in FIG. 7), in a direction generally toward a driver. Thus, the pedal arm 12 of the pedal 10 is able to pivot about pin 18 such that it assists in reducing injury to the driver or user (e.g., the ankles, shins, or knees of the driver).

As noted above, an alternative direction may be used for the pivot axis P. In the case of the pivoting reaction mount 44 being rotational or pivotal about a rotational axis that is provided 90 degrees from the depicted pivot axis P, i.e., in a substantially vertical configuration, the push rod 14 and its end 17 would be disconnected from the mount 44 and may be guided to move in a relatively left or right direction in the event of an incident.

The directional references used herein and the directional arrows in the Figures are used in a relative sense. That is, they are being used to describe movement of parts relative to one another, and are not being used in "absolute" terms. For example, in a front end collision with a stationary object, the front end parts would be more stationary with the inertia of structures towards the actual user of the vehicle moving forward by inertia. Likewise, where the vehicle is stationary and struck in its front end, the front end parts would be predominantly moving rearwardly in an absolute sense. But in either sense, the motion of those parts can be described as in a rearward direction in a relative sense with respect to the pedal and the vehicle structure 36 to which the actuation mechanism 32 is attached.

As has become evident, the structures in the pedal assembly 10 and release mechanism 30 as herein described provide several advantages over the prior art. Besides minimizing or preventing injury to a driver's lower extremities, one difference between this mechanism and other known solutions is that the pivoting reaction mount 44 provides multiple functions using a single element. That is, the mount 44 is configured to directly connect the pedal arm 12 and the push rod 14 in normal operation circumstances, as well as directly decouple the two device in the event of an incident or collision. Known systems, however, tend to use separate elements for normal operation (e.g., connection of the push rod 14 and pedal arm 12) and for a decoupling action.

Additionally, the release mechanism 30 as described herein may be mounted in any number of locations with respect to the pedal arm 12 or pedal plate 16. For example, the mechanism 30 may be placed or mounted above, below, forward, or aft of the pedal 10 and its components. Thus, this disclosure provides a design that is more flexible and easier to package than prior art devices.

Furthermore, the herein described devices substantially reduces the number of parts to be used. Known systems generally require a larger number of parts, and therefore are tedious, require more money, and more time for assembly. The pedal 10 and its release mechanism 30 also allows for the pedal to still provide limited function after a crash (i.e., not entirely inoperable) though the pedal arm 12 and push rod 14 have been disconnected. This is often a customer requirement that is not met by the prior art.

In some embodiments, as shown in FIGS. 2 and 7, a secondary brake engaging device 60 or mechanism may be provided to enable the pedal 10 to have some brake function. The secondary brake engaging device 60 may be a part that is mounted, attached, or formed on the pedal arm 12 (such as on elongated pedal structure 13) or on the mounting bracket 46, for example. The secondary brake engaging device 60 may have a recess, such as, rounded portion 62 which may cooperate with rounded end portion 17 of the push rod 14. More specifically, after the push rod 14 disconnects from the pivot reaction mount 44, the secondary brake engaging device 60 limits or stops the movement of the push rod by having at least the rounded portion 62 come into contact with the end portion 17 of the push rod 14, as depicted in FIG. 7, for example. This also provides the driver with a second chance to stop the vehicle, while the disconnection of the rod 14 by the release of the mount 44 provides travel for the rod 14 during which no force is transferred to the pedal arm and the user's foot. In some cases, a location for mounting the secondary brake engaging device 60 may be determined by a distance X, which may be defined as a distance between a center of the end portion 17 and the pivot point or location of the pivot axis P of the pivoting reaction mount 44 after the push rod 14 is released or disconnected therefrom.

Additionally, the described design of the end 17 of the push rod 14 is capable of being reassembled, unlike the breaking of joints provided in the current art. Such a design particularly may allow for less costly and time consuming repairs after an incident.

Though the preferred setting for this invention is as a crash decoupler or disconnection device for brake and/or clutch pedals, it should also be noted that it is envisioned that in some embodiments the above-described release mechanism 30 could also be employed to disconnect a spring assembly on brake or clutch pedals, or on brake-by-wire and clutch-by-wire units. Furthermore, as previously noted, it is envisioned that although the pedal 10 is described as being used as a brake pedal for a brake system in a vehicle, the pedal 10 may be also be used for other systems and in other types of vehicles (e.g., trucks, trailers, or similar machinery such as construction equipment).

Also, it should be noted that the pedal assembly 10 may also be used in combination with any number of sensing devices or sensors, such as, but not limited to, speed-sensing sensors (i.e., speed the vehicle is traveling) or air bag deployment sensors. Additionally, in some instances, it is envisioned that a predetermined amount of force or vehicle travel speed must be met in order for the pedal structure to be released.

While the principles of the invention have been made clear in the illustrative embodiments set forth above, it will be apparent to those skilled in the art that various modifications may be made to the structure, arrangement, proportion, elements, materials, and components used in the practice of the invention.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. A pedal assembly for operating a push rod that activates a functional system of a vehicle, the pedal assembly comprising:
    a pedal arm comprising an elongated structure, a first end of the elongated structure configured to be pivotally mounted and a second end of the elongated structure having a pedal plate attached thereto, the pedal plate being accessible by a foot of a driver;
    a release mechanism comprising a pivoting reaction mount and an actuation mechanism, the pivoting reaction mount being configured to connect a push rod to the pedal arm to enable pivoting of the pedal arm to push the push rod, the pivoting reaction mount being pivotally mounted to the pedal arm for pivoting between (a) a first position wherein the pivoting reaction mount is directly connected to the push rod to connect the push rod to the pedal arm and (b) a second position wherein the pivoting reaction mount is disconnected from the push rod to disconnect the push rod from the pedal arm;
    the pivoting reaction mount having a contact portion for contacting to pivot the reaction mount between the first and second positions; and
    the actuation mechanism being configured to mount to a vehicle structure in spaced relation to the contact portion of the pivoting reaction mount, the actuation mechanism configured to contact the contact portion during a vehicle collision and actuate the pivoting of the pivoting reaction mount from the first position to the second position such that the push rod is disconnected from the pivoting reaction mount.

2. A pedal assembly according to claim 1, wherein the release mechanism further comprises a rotatable lever connected to the pivoting reaction mount, the rotatable lever configured to rotate about an axis, and wherein the rotation of the rotatable lever about the axis actuates the rotation of the pivoting reaction mount from the first position to the second position.

3. A pedal assembly according to claim 2, wherein the rotatable lever further comprises a lever end extending outwardly therefrom, the lever end acting as the contact portion, and wherein the actuation mechanism actuates the rotation of the rotatable lever via contact with the lever end.

4. A pedal assembly according to claim 3, wherein the actuation mechanism comprises a reaction bracket mounted in a spaced relation to the lever end, the reaction bracket configured to come into contact with the lever end during collision thereby actuating rotation of the rotatable lever.

5. A pedal assembly according to claim 1, wherein the actuation mechanism comprises a reaction bracket, the reaction bracket configured to come into contact with the contact portion during collision thereby actuating rotation of the pivoting reaction mount.

6. A pedal assembly according to claim 1, wherein the actuation mechanism is mounted in a position that is closer to the driver than a mounting position of the pivoting reaction mount during normal operation of the vehicle.

7. A pedal assembly according to claim 1, wherein the rotation of the pivoting reaction mount is actuated as a result of relative movement the vehicle structure and a front part of the vehicle during the collision.

8. A pedal assembly according to claim 1, wherein the pivoting reaction mount has a receiving area, the receiving area configured to receive and lock an end portion of the push rod therein when the pivoting reaction mount is in the first position and configured to release the end portion of the push rod when the pivoting reaction mount is in the second position.

9. A pedal assembly according to claim 8, wherein the end portion of the push rod comprises a substantially round end portion that is received by inner walls of the pivoting reaction mount, the inner walls having corresponding contoured surfaces for removably receiving the substantially round end portion therein.

10. A pedal assembly according to claim 1, wherein the functional system of the vehicle is a brake system.

11. A pedal assembly according to claim 1, wherein the vehicle structure is selected from the group consisting of an instrument panel and a cross beam.

12. A pedal assembly according to claim 1, further comprising a secondary brake engaging device configured to limit movement of the push rod after the push rod is disconnected from the pedal arm.

13. A pedal assembly according to claim 1, wherein the actuation mechanism and contact portion of the pivoting reaction mount are out of contact with each other during normal operation of the pedal assembly in the vehicle.

14. A vehicle comprising a pedal assembly, the pedal assembly comprising:
    a pedal arm pivotally mounted in the vehicle and having a pedal plate attached thereto, the pedal plate being accessible by a foot of a driver;
    a push rod releasably connected to the pedal arm, the push rod configured to be pushed so as the pedal arm pivots due to an application of force by the foot of the driver on the pedal plate;
    a release mechanism comprising a pivoting reaction mount and an actuation mechanism, the pivoting reaction mount being configured to connect the push rod to the pedal arm to enable pivoting of the pedal arm to push the push rod, the pivoting reaction mount being pivotally mounted to the pedal arm for pivoting between (a) a first position wherein the pivoting reaction mount is directly connected to the push rod to connect the push rod to the pedal arm and (b) a second position wherein the pivoting reaction mount is disconnected from the push rod to disconnect the push rod from the pedal arm;
    the pivoting reaction mount having a contact portion for contacting to pivot the reaction mount between the first and second positions; and
    the actuation mechanism being configured to mount to a vehicle structure in spaced relation to the contact portion of the pivoting reaction mount, the actuation mechanism configured to contact the contact portion during a vehicle collision and actuate the pivoting of the pivoting reaction mount from the first position to the second position such that the push rod is disconnected from the pivoting reaction mount.

15. A vehicle according to claim 14, wherein the actuation mechanism comprises a reaction bracket, the reaction bracket configured to come into contact with the contact portion during collision thereby actuating rotation of the pivoting reaction mount.

16. A vehicle according to claim 14, wherein the release mechanism further comprises a rotatable lever connected to the pivoting reaction mount, the rotatable lever configured to rotate about an axis, and wherein the rotation of the rotatable lever about the axis actuates the rotation of the pivoting reaction mount from the first position to the second position.

17. A vehicle according to claim 16, wherein the actuation mechanism comprises a reaction bracket mounted in a spaced relation with the lever, the reaction configured to come into contact with the lever during collision thereby actuating rotation of the rotatable lever.

18. A vehicle according to claim 17, wherein the rotatable lever further comprises a lever end extending outwardly therefrom, and wherein the bracket and the lever end come into contact with each other, the lever end acting as the contact portion for actuating the pivoting of the pivoting reaction mount.

19. A vehicle according to claim 14, wherein the actuation mechanism is mounted in a position that is closer to the driver than a mounting position of the pivoting reaction mount during normal operation of the vehicle.

20. A vehicle according to claim 14, wherein the rotation of the pivoting reaction mount is actuated as a result of relative movement the vehicle structure and a front part of the vehicle during the collision.

21. A vehicle according to claim 14, wherein the pedal assembly is a brake pedal assembly, and wherein pushing of the push rod is configured to activate a brake system of the vehicle.

22. A vehicle according to claim 14, further comprising a secondary brake engaging device configured to limit movement of the push rod after the push rod is disconnected from the pedal arm.

23. A vehicle according to claim 14, wherein the actuation mechanism and contact portion of the pivoting reaction mount are out of contact with each other during normal operation of the pedal assembly in the vehicle.

* * * * *